(12) United States Patent
Giuliano et al.

(10) Patent No.: US 11,411,501 B2
(45) Date of Patent: Aug. 9, 2022

(54) SLEW-CONTROLLED SWITCHED CAPACITORS FOR AC-DC APPLICATIONS

(71) Applicant: pSemi Corporation, San Diego, CA (US)

(72) Inventors: David Giuliano, Brookline, MA (US); David Kunst, Cupertino, CA (US)

(73) Assignee: PSEMI CORPORATION, San Diego, CA (US)

( * ) Notice: Subject to any disclaimer, the term of this patent is extended or adjusted under 35 U.S.C. 154(b) by 0 days.

(21) Appl. No.: 16/936,309

(22) Filed: Jul. 22, 2020

(65) Prior Publication Data

US 2021/0075328 A1 Mar. 11, 2021

Related U.S. Application Data

(63) Continuation of application No. 16/083,654, filed as application No. PCT/US2017/022281 on Mar. 14, 2017, now Pat. No. 10,770,976.

(60) Provisional application No. 62/307,703, filed on Mar. 14, 2016.

(51) Int. Cl.
*H02M 3/07* (2006.01)
*H02M 3/335* (2006.01)
*H02M 3/158* (2006.01)
*H02M 1/00* (2006.01)

(52) U.S. Cl.
CPC ......... *H02M 3/33546* (2013.01); *H02M 3/07* (2013.01); *H02M 3/073* (2013.01); *H02M 3/158* (2013.01); *H02M 1/007* (2021.05); *H02M 1/0029* (2021.05)

(58) Field of Classification Search
CPC .... H02M 3/33546; H02M 3/07; H02M 3/073; H02M 3/158; H02M 1/007; H02M 1/0029
See application file for complete search history.

(56) References Cited

U.S. PATENT DOCUMENTS

| | | | |
|---|---|---|---|
| 6,906,567 B2 * | 6/2005 | Culler | H03K 19/00384 327/170 |
| 9,621,138 B1 * | 4/2017 | Zhang | H03K 3/353 |

* cited by examiner

*Primary Examiner* — Dinh T Le
(74) *Attorney, Agent, or Firm* — Finnegan, Henderson, Farabow, Garrett & Dunner, LLP

(57) ABSTRACT

In a power converter, a regulator that receives a first voltage couples to a switched-capacitor converter that provides a second voltage. Slew-control circuitry controls slew rate within the switched-capacitor converter during operation thereof. A controller controls the operation of both the regulator and the switched-capacitor converter.

20 Claims, 8 Drawing Sheets

| Item | Total Value | Comp. Size (W x L x H) | Quantity |
|---|---|---|---|
| L1 | 120 nH | 4.00 x 4.00 x 1.20 mm$^3$ | 1 |
| C0 | 40 μF | 1.60 x 0.80 x 1.00 mm$^3$ | 8 |
| C1 | 10 μF | 2.00 x 1.25 x 1.25 mm$^3$ | 2 |
| C2 | 10 μF | 2.00 x 1.25 x 1.25 mm$^3$ | 2 |
| C3 | 10 μF | 2.00 x 1.25 x 1.25 mm$^3$ | 1 |
| C4 | 10 μF | 2.00 x 1.25 x 1.25 mm$^3$ | 1 |

| V2 | S1 | S2 | S3 | 1st Stage | 2nd Stage |
|---|---|---|---|---|---|
| 5 V | OFF | OFF | ON | ON | ON |
| 10 V | OFF | ON | OFF | ON | OFF |
| 20 V | ON | OFF | OFF | OFF | OFF |

| Item | Total Value | Comp. Size (W x L x H) | Quantity |
|------|-------------|------------------------|----------|
| L1 | 120 nH | 4.00 x 4.00 x 1.20 mm$^3$ | 1 |
| C0 | 40 μF | 1.60 x 0.80 x 1.00 mm$^3$ | 8 |
| C1 | 5 μF | 1.60 x 0.80 x 1.00 mm$^3$ | 5 |
| C2 | 5 μF | 1.60 x 0.80 x 1.00 mm$^3$ | 5 |
| C3 | 10 μF | 2.00 x 1.25 x 1.25 mm$^3$ | 2 |
| C4 | 10 μF | 2.00 x 1.25 x 1.25 mm$^3$ | 2 |
| C5 | 10 μF | 2.00 x 1.25 x 1.25 mm$^3$ | 1 |
| C6 | 10 μF | 2.00 x 1.25 x 1.25 mm$^3$ | 1 | ated, to power converters that use switched capacitors.

SLEW-CONTROLLED SWITCHED CAPACITORS FOR AC-DC APPLICATIONS

RELATED APPLICATIONS

This application claims the benefit of the Mar. 14, 2016 priority date of U.S. Provisional Application 62/307,703, the contents of which are herein incorporated by reference.

FIELD OF INVENTION

This invention relates to power conversion, and in particular, to power converters that use switched capacitors.

BACKGROUND

Many portable electrical devices are used while the device is plugged into an AC source. During this time, a battery manager must provide power to both charge the battery, if necessary, and to operate the device itself. When the AC source is disconnected, the battery manager must switch over so that the battery provides power to the device.

SUMMARY

In one aspect, the invention features a regulator that receives a first voltage and, coupled to it, a switched-capacitor converter that provides a second voltage. Slew-control circuitry controls slew rate within the switched-capacitor converter during operation thereof. A controller controls the operation of both the regulator and the switched-capacitor converter.

In some embodiments, the switched-capacitor converter includes multiple stages and bypass switches that are configured to switch one or more stages into or out of the switched-capacitor circuit. This permits different voltage conversion ratios to be achieved. Among these embodiments are those with two stages and those with three stages. Also among these are embodiments in which at least one bypass switch is configured to block flow of reverse current when the another bypass switch is closed. This can be achieved by, for example, forming the bypass switch from a pair of transistors connected back-to-back or by forming it from a transistor having an adaptive body switch.

In other embodiments, the switched-capacitor converter is a single-stage switched-capacitor circuit having switches that transition between switch states so as to cause the switched-capacitor circuit to operate at different voltage conversion ratios.

Also among the embodiments are those in which the controller includes a primary side section that controls a switch that selectively passes current through a primary winding of a transformer and a secondary side section, which is isolated from the primary side section, that controls the switched-capacitor converter.

In other embodiments, the switched-capacitor converter includes a first stage and a second stage, and wherein each of the first and second stages is a voltage divider.

Embodiments of the slew-control circuitry include those that have a charge reservoir for controlling slew rate of a switch to which the slew-control circuitry is coupled, those that have a capacitor and a constant current source for to be used for controlling slew rate, and those that have a capacitor and a resistor through which to discharge the capacitor when controlling slew rate. Also among the embodiments are those in which the slew-control circuitry includes additional circuitry for protection against a fault within the apparatus, those in which the slew-control circuitry further includes a comparator configured to halt slew control upon occurrence of a condition, those in which it is reconfigurable, and those in which it is programmable.

In some embodiments, the switched-capacitor converter is adiabatic, whereas in others, it is diabatic.

Other embodiments feature a bridge rectifier disposed to transform an AC voltage into the first voltage. Among these are embodiments in which the bridge rectifier includes bridge diodes arranged to form the bridge and a bridge capacitor across which an output of the bridge is present during operation of the bridge rectifier. In some of these embodiments, a active power-factor control circuit couples to the bridge rectifier. In others, the bridge rectifier couples to an electromagnetic interference filter disposed to suppress radiation generated during operation.

Some embodiments also feature a fuse disposed to prevent excess current within the apparatus.

Some embodiments include an AC source for providing the AC voltage. Among these are those in which the AC source is a component of a wireless charging system.

In other embodiments, the regulator, the switched-capacitor converter, the slew-control circuitry, and the controller are disposed in a travel adapter. In some of these embodiments, the travel adapter has a USB port maintained at the second voltage.

In some embodiments, the switched-capacitor converter includes a charge pump and an inductance coupled to the charge pump.

In other embodiments, switched-capacitor converter includes a cascade multiplier. Among these are embodiments in which the cascade multiplier is an adiabatic cascade multiplier and those in which it is a diabatic cascade multiplier.

In yet other embodiments, the switched-capacitor converter is one that, during operation thereof, causes at least one capacitor therein to experience a change in charged stored therein by causing charge to be passed through a non-capacitive element.

Further embodiments include those in which the switched capacitor converter includes a multi-phase network, those in which the switched capacitor converter includes a ladder network, those in which the switched capacitor converter includes a Dickson network, those in which the switched capacitor converter includes a series-parallel network, those in which the switched capacitor converter includes a Fibonacci network, and those in which the switched capacitor converter includes a doubler network.

Other embodiments include rate-control circuitry. In these embodiments, the switched-capacitor converter includes a first capacitor, that, during operation of the switched-capacitor converter, has an amount of charge stored thereon. The rate-control circuitry constrains a rate at which the amount of charge is changed to at least in part as a result of causing charge to pass through an inductance.

Embodiments of the invention include those in which the regulator is a magnetically-isolated regulator. Among these are embodiments in which the regulator includes a fly-back converter, such as a quasi-resonant fly-back converter, an interleaved fly-back converter, a two-switch fly-back converter. and an active-clamp fly-back converter. Also among the embodiments are those in which the regulator includes a forward converter. Among these are embodiments in which it is a multi-resonant forward converter, an active-clamp forward converter, and a two-switch forward converter.

Embodiments also include those in which the magnetically-isolated regulator includes a half-bridge converter.

Among these are embodiments in which the half-bridge converter includes an asymmetric half-bridge converter, embodiments in which the half-bridge converter includes a multi-resonant half-bridge converter, embodiments in which the half-bridge converter includes an LLC resonant half-bridge converter, and embodiments in which the half-bridge converter includes a full-bridge converter.

Also among the embodiments are those in which the regulator includes a non-isolated regulator. Among these are those in which the non-isolated regulator includes a boost converter, those in which it includes a buck-boost converter, and those in which it includes a buck converter, those in which it includes a galvanically-isolated regulator.

In some embodiments, the regulator includes first and second functional components that communicate energy therebetween in the absence of electrical conduction therebetween. Among these are embodiments in which an intermediary enables communication of energy between the first and second functional components in the absence of electrical conduction therebetween. These include embodiments in which energy is stored in a magnetic field.

In another aspect, the invention features a computer-readable medium having encoded thereon information that represents any of the foregoing combinations.

These and other features of the invention will be apparent from the following detailed description and the accompanying figures, in which:

DETAILED DESCRIPTION

Before describing several exemplary embodiments of power converter circuits and processing performed by and on such power converter circuits, it should be appreciated that, in effort to promote clarity in explaining the concepts, reference is sometimes made herein to specific switched-capacitor circuits or specific switched-capacitor circuit topologies. It should be understood that such references are merely exemplary and should not be construed as limiting.

As used herein, ac-dc converters are the same as AC/DC converters; and switched-capacitor circuits are the same as switched-capacitor networks and charge pumps.

Figure 1:
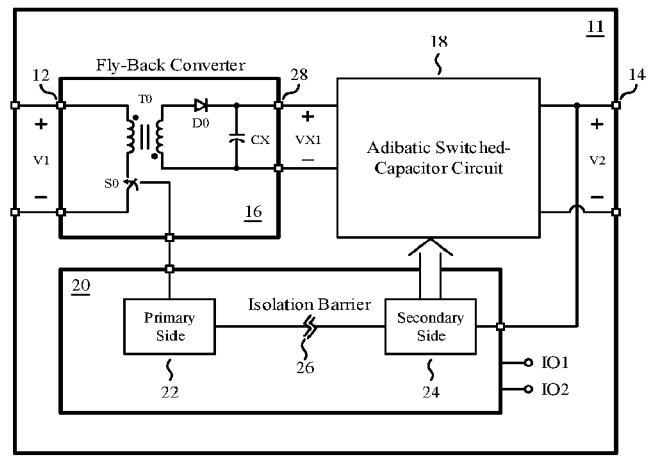
FIG. 1 shows a two-stage power conversion circuit.

FIG. 1 shows a two-stage power conversion circuit 11 having a first terminal 12 that connects to a first stage and a second terminal 14 that connects to a second stage. The first terminal 12 is at a first voltage V1 and the second terminal 14 is at a second voltage V2.

In the illustrated embodiment, the first stage is implemented as a switch-mode pre-regulator 16 and the second stage is implemented as an adiabatic switched-capacitor circuit 18. However, in alternative embodiments, this second stage is non-adiabatic, or diabatic.

The pre-regulator 16 can be implemented in a variety of ways, so long as the essential function thereof, namely regulation of an output voltage, can be carried out. In the illustrated embodiment, the pre-regulator 16 includes a pre-regulator switch S0, a transformer T0, a diode D0, and a filter capacitor CX. A particularly useful implementation of a pre-regulator 16 is a magnetically-isolated converter, an example of which is a fly-back converter.

A variety of fly-back converters can be used to implement the pre-regulator 16. These include a quasi-resonant fly-back converter, an active-clamp fly-back converter, an interleaved fly-back converter, and a two-switch fly-back converter.

Other examples of magnetically-isolated converters are forward converters. Examples of suitable forward converters include a multi-resonant forward converter, an active-clamp forward converter, an interleaved forward converter, and a two-switch forward converter.

Yet other examples of magnetically-isolated converters are half-bridge converters and full-bridge converters. Examples of half-bridge converters include an asymmetric half-bridge converter, a multi-resonant half-bridge converter, and an LLC resonant half-bridge converter. Examples of full-bridge converters include an asymmetric full-bridge converter, a multi-resonant full-bridge converter, and an LLC resonant full-bridge converter.

It is also possible to implement the pre-regulator 16 using a non-isolated converter. Examples include a buck converter, a boost converter, and a buck-boost converter.

As used herein, two functional components are said to be "isolated," or more specifically, "galvanically isolated," if energy can be communicated between those components without a direct electrical conduction path between those components. Such isolation thus presupposes the use of another intermediary for communicating energy between the two components without having actual electrical current flowing between them. In some cases, this energy may include information.

Examples include the use of a wave, such as an electromagnetic, mechanical, or acoustic wave. As used herein, electromagnetic waves include waves that span the visible range, the ultraviolet range, and the infrared range. Such isolation can also be mediated through the use of quasi-static electric or magnetic fields, capacitively, inductively, or mechanically.

Most functional components have circuitry in which different parts of the circuit are at different electrical potentials. However, there is always a potential that represents the lowest potential in that circuit. This is often referred to as "ground" for that circuit.

When a first and second functional component are connected together, there is no guarantee that the electrical potential that defines ground for the first component will be the same as the electrical potential that defines ground for the second circuit. If this is the case, and if these components are connected together, it will be quite possible for electrical current to flow from the higher of the two grounds to the lower of the two grounds. This condition, which is called a "ground loop," is undesirable. It is particularly undesirable if one of the two components happens to be a human being. In such cases, the current in the ground loop may cause injury.

Such ground loops can be discouraged by galvanically isolating the two components. Such isolation essentially forecloses the occurrence of ground loops and reduces the likelihood that current will reach ground through some unintended path, such as a person's body.

The switched-capacitor circuit 18 can be implemented as a switched-capacitor network. Examples of such networks include ladder networks, Dickson networks, Series-Parallel networks, Fibonacci networks, and Doubler networks. These can all be adiabatically charged and configured into multi-phase networks. A particularly useful switched-capacitor network is an adiabatically charged version of a full-wave cascade multiplier. However, diabatically charged versions can also be used.

As used herein, changing the charge on a capacitor "adiabatically" means causing an amount of charge stored in that capacitor to change by passing the charge through a non-capacitive element. A positive adiabatic change in charge on the capacitor is considered adiabatic charging while a negative adiabatic change in charge on the capacitor is considered adiabatic discharging. Examples of non-capacitive elements include inductors, magnetic elements, resistors, and combinations thereof. These non-capacitive elements all have the property of constraining the rate at which the quantity of charge on the capacitor can change.

In some cases, a capacitor can be charged adiabatically for part of the time and diabatically for the rest of the time. Such capacitors are considered to be adiabatically charged. Similarly, in some cases, a capacitor can be discharged adiabatically for part of the time and diabatically for the rest of the time. Such capacitors are considered to be adiabatically discharged.

Diabatic charging includes all charging that is not adiabatic and diabatic discharging includes all discharging that is not adiabatic.

As used herein, an "adiabatic switched-capacitor circuit" is a network having at least one capacitor that is both adiabatically charged and adiabatically discharged. A "diabatic switched-capacitor circuit" is a network that is not an adiabatic switched-capacitor circuit.

Examples of pre-regulators 16, switched-capacitor circuits 18, their accompanying circuitry, and packaging techniques can be found U.S. Pat. Nos. 9,362,826, 9,497,854, 8,723,491, 8,503,203, 8,693,224, 9,502,968, 8,619,445, 9,203,299, and 9,041,459, U.S. Patent Publications 2016/0197552, 2015/0102798, 2014/0301057, 2013/0154600, 2015/0311786, 2014/0327479, 2016/0028302, 2014/0266132, 2015/0077175, and 2015/0077176, and PCT publications WO2014/1062279, WO2015//138378, WO2015//138547, WO2016//149063, and WO 2017/007991, the contents of which are herein incorporated by reference.

Adiabatic switched-capacitor circuits are described in detail in U.S. Pat. No. 8,860,396, issued Oct. 14, 2014, in U.S. Provisional Applications 62/132,701 and 62/132,934, both of which were filed on Mar. 13, 2015. The contents of the foregoing documents are incorporated herein by reference.

A controller 20 controls the operation of the first and second stages. The controller 20 includes a primary side 22 that controls the first stage and a secondary side 24 that controls the second stage. An isolation barrier 26 separates the primary side 22 from the secondary side 24.

The controller 20 receives first and second input/output signals IO1, IO2. These signals, which can be digital or analog, serve a variety of functions. Some are feedback signals that the controller 20 uses for carrying out its control algorithm. Others are output signals that the controller 20 uses to communicate its state. Yet others are input signals that communicate, to the controller 20, what the controller 20 should do. These signals can also be reference signals. Although only two signals IO1, IO2 are actually shown, this is only for the sake of clarity. In principle, many signals are possible.

Feedback signals can come from a variety of locations. One suitable location is a connection to the second terminal 12. However, the controller 20 may also receive feedback signals from various other locations, such as locations within the pre-regulator 16 or locations within the switched-capacitor circuit 18. These signals enable the controller 20 to use currents and voltages from various locations to carry out its control algorithm.

In addition to feedback signals, the controller 20 also receives input signals to set its operating parameters. These might, for example, specify a desired switching frequency or output voltage.

From time to time, the controller 20 may also generate output signals to communicate its state. For example, an output signal may indicate a problem with the controller 20, such as a fault. Or an output signal could provide telemetry information such as the voltage at the second terminal 12.

The controller 20 may also require certain reference signals in the course of its operation. Examples include a signal that provides a fixed value, such as a band gap reference signal, or a periodic signal, such as a clock signal.

The primary side 22 of the controller 20 controls the pre-regulator switch S0. Opening and closing the pre-regulator switch S0 controls the current provided to a primary side of the transformer T0. This, in turn, controls the voltage across the filter capacitor CX. When the pre-regulator switch S0 is on, the diode D0 is off and when the pre-regulator switch S0 is off, the diode D0 is on.

The pre-regulator 16 also includes a regulator-output terminal 28 maintained at an intermediate voltage VX1 that is lower than the first voltage V1. This regulator-output terminal 28 connects to the adiabatic switched capacitor circuit 18. The adiabatic switched-capacitor circuit 18 thus receives this intermediate voltage VX1 and transforms it into the second voltage V2.

The adiabatic switched-capacitor circuit 18 operates in discrete steps. Thus, it only provides coarse regulation of its output. It cannot provide fine regulation of its output. It is for the pre-regulator 16 to carry out this fine regulation. The two-stage design shown in FIG. 1 reduces the need for the pre-regulator 16 to sustain a high-current burden. This means that the secondary winding of the transformer T0 can instead carry a much smaller RMS current. This, in turn, lowers winding loss and reduces the voltage ripple at the regulator-output terminal 28. It also means that the filter capacitor CX that couples the pre-regulator 16 to the adiabatic switched-capacitor circuit 18 can be made smaller.

However, the improved performance of the pre-regulator 16 cannot be completely offset by the increased size and power loss of the switched-capacitor circuit 18 in the second stage. Therefore, it is imperative that the adiabatic switched-capacitor circuit 18 be both extremely efficient and small.

The two-stage power conversion circuit 10 in FIG. 1 is shown as being configured to receive a DC voltage. In an alternative embodiment shown in FIG. 2, a bridge rectifier 65 coupled to the first terminal 12 by a coupling capacitor CB provides a way to receive an AC voltage VAC.

Figure 2:
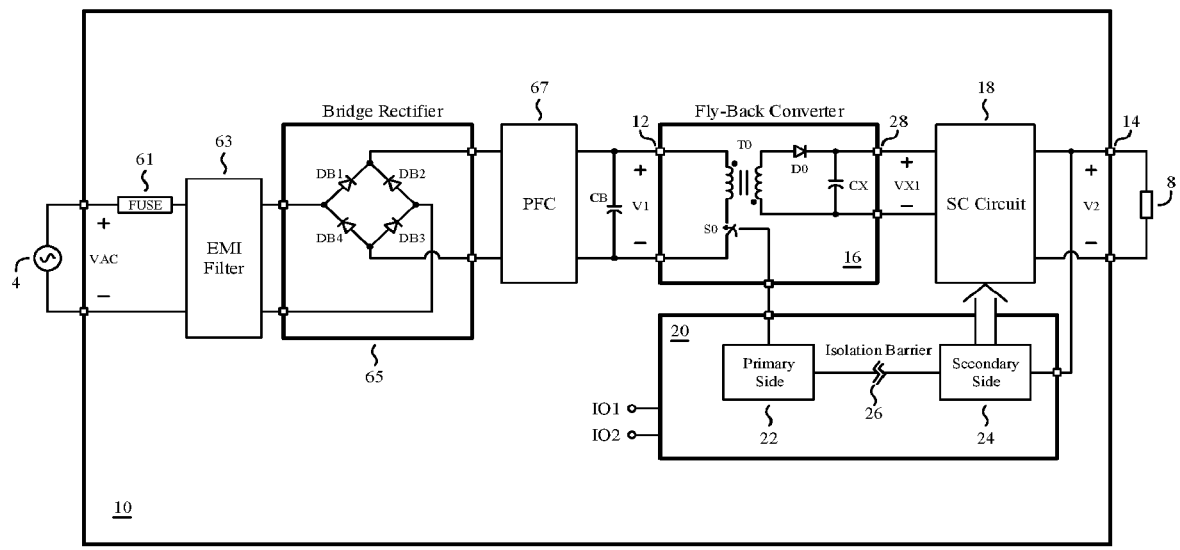
FIG. 2 shows the circuit of FIG. 1 with additional circuitry for receiving an AC voltage.
Figure 15:
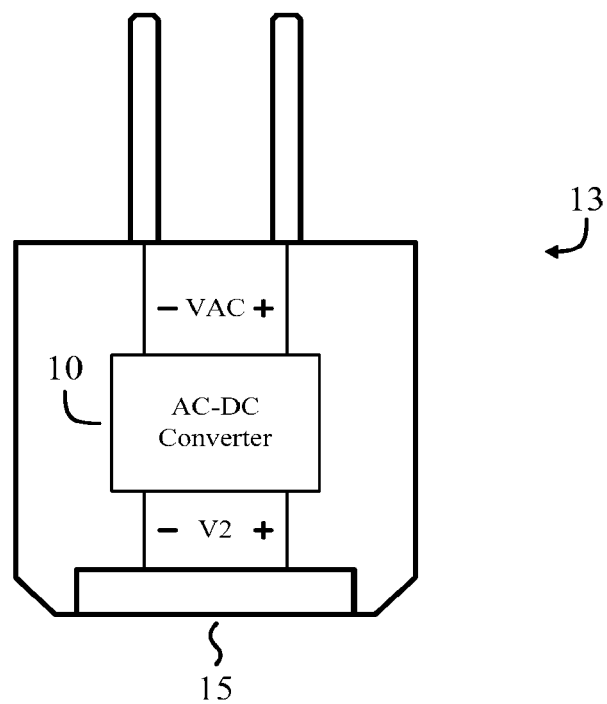
FIG. 15 shows the circuit of FIG. 2 incorporated into a travel adapter.

More specifically, FIG. 2 shows a power-conversion circuit 10 similar to that shown in FIG. 1 but with additional circuitry for receiving an AC voltage VAC provided by an AC source 4 and converting that AC voltage VAC into the second voltage V2. The AC voltage VAC is provided to input terminals of a bridge rectifier 65 having bridge diodes DB1, DB2, DB3, and DB4 arranged to form a bridge and having an output across a bridge capacitor CB. The output across the bridge capacitor CB becomes the first voltage V1 presented at the first terminal 12. A power-conversion circuit 10 of this type may be incorporated into a travel adapter 13, as shown in FIG. 15. Such a travel adapter 13 outputs a DC voltage at a USB port 15 thereof.

Some embodiments include circuitry for controlling harmonic current and thus boosting the ratio of real power to apparent power that flows through the power supply. This is particularly useful for power supplies that attach to a wall-outlet that supplies an AC voltage. An example of such circuitry is an active power-factor corrector 67 disposed between the bridge rectifier 65 and the pre-regulator 16.

FIG. 2 also shows a fuse 61 between the AC power source 4 and the remaining components of the power-conversion circuit 10 for safety. An electromagnetic interference filter 63 is also provided to suppress the uncontrolled emission of electromagnetic waves that may arise during operation of the power-conversion circuit 10.

Other embodiments include circuitry to accommodate wireless charging. In such embodiments, the AC power source 4 would include a base station having a frequency-converter connected to a first coil. The base station receives line power and provides it to the frequency-converter, which steps it up to a frequency high enough to permit the use of a reasonably sized first coil. The device to be charged has a second coil that is selected such that when the first and second coils are brought close together, they form an air-core transformer. This permits coupling of energy from the base station to the device to be charged without the use of a wire to connect them.

In some embodiments of a wireless charging system, the bridge rectifier 65 and its accompanying circuitry, which may include the fuse 61, the electromagnetic interference filter 63, and the active power-factor corrector 67, are located at the base station. In other embodiments, they are instead located at the device to be charged. Alternative embodiments for wireless charging feature two bridge rectifiers 65: one located in the base station and another located in the device to be charged.

Figure 3:
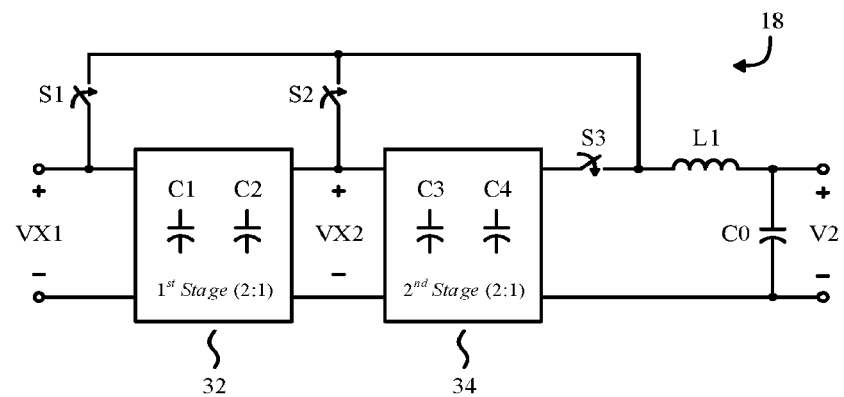
FIG. 3 shows a first embodiment of a switched-capacitor architecture for use in the power conversion circuit of FIGS. 1 and 2.

FIG. 3 shows a first embodiment of an adiabatic switched-capacitor circuit 18 that is designed to accept a nominal voltage of 20 volts and to produce a variety of output voltages, such as 5 volts and 10 volts. This is particularly useful for Type-C travel adapters. This is because, unlike the older USB standards, in which the output is always five volts, the newer USB Type C standard permits higher output voltages, such as ten, fifteen, and even twenty volts.

The illustrated adiabatic switched-capacitor circuit 18 features a first switched-capacitor stage 32, a second switched-capacitor stage 34, a first bypass-switch S1, a second bypass-switch S2, and a third bypass-switch S3. An LC filter having an output inductor L1 and an output capacitor C0 permits adiabatic operation. By selectively opening and closing the bypass-switches S1, S2, S3, it is possible to selectively bypass selected ones of the first and second switched-capacitor stages 32, 34.

Each of the first and second stages 32, 34 is a 2× voltage divider having a maximum voltage conversion from VX1 to V2 of 4:1. The resulting adiabatic switched-capacitor circuit 18 is designed to accept an intermediate voltage VX1 of 20 volts and to provide a voltage of either 20 volts, 10 volts, or 5 volts. Some embodiments deliver a 15-volt output voltage, which is sometimes required by the Type-C standard. This can be provided by having the pre-regulator 16 deliver 15 volts to the switched-capacitor circuit 18 instead of 20 volts and running the switched-capacitor circuit 18 in the 1:1 mode.

The adiabatic switched-capacitor circuit 18 shown in FIG. 3 has three modes of operation, a 1:1 mode, a 2:1 mode, and a 4:1 mode. In the 1:1 mode, the first bypass-switch S1 closes, and the second and third bypass-switches S2 and S3 open. In the 2:1 mode, the second bypass-switch S2 closes and the first and third bypass-switches S1 and S3 open. In the 4:1 mode, the third bypass-switch S3 closes and the first and second bypass-switches S1 and S2 open. All bypassed stages run in a low-power mode to save power since they are not needed to provide voltage conversion, i.e., they are not switching at a specific frequency.

Figure 4:
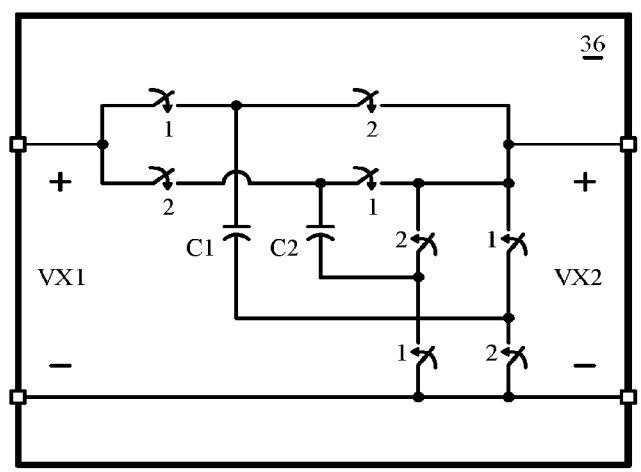
FIG. 4 shows a switching circuit contained in the stages of the power conversion circuit of FIG. 3.

FIG. 4 illustrates a switched-capacitor circuit 36 inside the first stage. A similar circuit is within the second stage. During operation, this circuit transitions between first and second states. In the first state, all switches labeled "1" close and all switches labeled "2" open. In the second state, all switches labeled "1" open and all switches labeled "2" close. The switched-capacitor circuit 36 alternates between the first and second state at a specific frequency. This frequency is one that is selected to produce a second intermediate voltage VX2 that is half of the intermediate voltage VX1.

Figures 5, 6, 7:
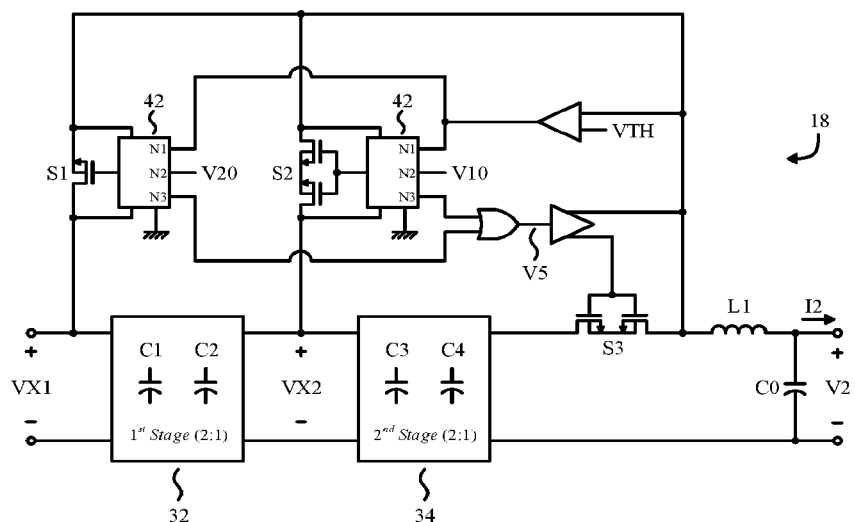
FIG. 5 is a parts list for the embodiment shown in FIG. 3.
FIG. 6 is a variant of the switched-capacitor architecture of FIG. 3 with circuitry for controlling slew rate.
FIG. 7 shows operation of switches shown in FIG. 6 for controlling slew rate.

FIG. 5 shows a component list for one implementation of the adiabatic switched-capacitor circuit 18 shown in FIG. 3. The components were selected so the solution provides a high efficiency, a small solution size, and a maximum output voltage ripple of 100 mV peak-to-peak. The "total value" column specifies the total amount of inductance and/or capacitance required of the components at their operating condition. For example, capacitor C3 has a nominal dc bias of 5 volts, therefore, a 22 μF capacitor was selected because it provides approximately 10 μF under this condition.

In an alternative embodiment, the first and second bypass-switches S1, S2 can be turned on and off in such a way that the second voltage V2 slews up and down in a controlled manner. This is particularly useful when there is a maximum slew rate to be met. For example, in the case of a Type-C USB power adapter, where the second voltage V2 is programmable from 5 volts to 20 volts, there is a maximum slew-rate requirement of 30 mV/μs for voltage transitions.

FIG. 6 shows an alternative embodiment of the adiabatic switched-capacitor circuit 18 of FIG. 3 in which first and second bypass switch control circuits 42 are added to control the slew rate of voltage transitions in the adiabatic switched-capacitor circuit 18 shown in FIG. 3. These bypass switch control circuits 42 control the slew rate of voltage transitions in the adiabatic switched-capacitor circuit 18 shown in FIG. 3 when the output transitions from 5 volts to 10 volts and from 5 volts to 20 volts. The bypass switch control circuit 42 also controls the second voltage 172 slew-rate from 10 volts to 5 volts and 20 volts to 5 volts. FIG. 7 shows a table of bypass switch states for three different voltage outputs.

Referring back to FIG. 6, to output 20 volts, one asserts a first control input 1720. To output only 10 volts, one asserts a second control input V10. By default, when neither the first nor the second output is asserted, the adiabatic switched-capacitor circuit 18 outputs 5 volts.

Figure 8:
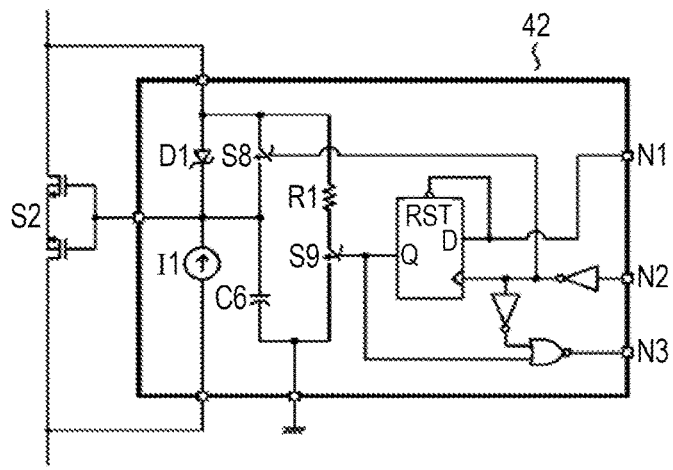
FIG. 8 shows details of a slew-rate control circuit from the switched-capacitor architecture shown in FIG. 6.

FIG. 8 shows details of a bypass switch control circuit 42 shown in FIG. 5. Although the second bypass switch S2 is shown in FIG. 8, the first bypass switch S1 is controlled in a similar way. All of the bypass switches S1, S2, and S3 are N-channel FETs (NFETs). The composite back-to-back NFET configuration for the second and third bypass switches S2, S3 is necessary to block the flow of reverse current from the output to the input when these switches are off while the first bypass switch S1 is on. Although the second and third bypass switches S2, S3 are depicted as discrete back-to-back NFETs in FIG. 8, these devices may be replaced by a single transistor with an adaptive body switch in a fully integrated solution.

A first slew-control switch S8 in FIG. 8 turns off the first and second bypass switches S1, S2 by shorting their gate and source terminals.

When either the first bypass switch S1 or the second bypass switch S2 is turned on, the first slew-control switch S8 (in the respective control) circuit opens, and the switched voltage 172 transitions from 5 volts to 10 volts or from 5 volts to 20 volts. Meanwhile, an anti-slewing capacitor C6 and a constant current source I1 control the upward slew rate of the second voltage V2 transition from 5 volts to 10 volts or 20 volts.

When the first and second bypass switches S1, S2 are turned off and the second voltage V2 transitions from 10 volts to 5 volts or 20 volts to 5 volts, a second slew-control switch S9 turns on and allows a bleeder resistor R1 to discharge the anti-slewing capacitor C6. This controls the downward slew rate of the second voltage V2.

A comparator in FIG. 6 detects when the second voltage V2 has dropped below a certain threshold VTH (e.g., VTH=5.25 V) and terminates the discharge of the anti-slewing capacitor C6 by opening the second slew-control switch S9. Note that the bleeder resistor R1 may be replaced by a current source, and the slew rates of both positive and negative voltage transitions may be programmed by making the current source I1, the bleeder resistor R1, and the anti-slewing capacitor C6 be programmable or reconfigurable.

When 20 volts is desired at the output, the second and third bypass switches S2, S3 are off while the first bypass switch S1 is on. The first and second (2:1) switched-capacitor stages are also off. The first bypass switch S1 is an N-channel FET (NFET) whose turn-on is controlled by the current source I1, which is a constant current source, and the anti-slewing capacitor C6 such that the second voltage V2 slews up at a fixed rate.

During the 5-volt to 20-volt transition, the first and second slew-control switches S8, S9 are open and the first bypass switch S1 acts as a source-follower. In this configuration, the voltage on the source of the first bypass switch S1 follows the voltage on its gate, which is given by the current though the current source I1 divided by the capacitance of the anti-slewing capacitor C6. Initially, when the first bypass switch S1 turns on and the second voltage V2 slews up, the first bypass switch S1 operates in the saturation region (i.e., $V_{DS} > V_{GS} - V_T$, where $V_T$ is the NFET's threshold voltage). As the output approaches its final level, the first bypass switch S1 transitions into the linear region and acts as a low-impedance switch. A Zener diode D1 clamps the gate-to-source voltage ($V_{GS1}$) of the bypass switch S1 to a safe level (e.g., $V_{GS1}$ equals 5 volts) during steady-state operation. The transition from 20 volts back to 5 volts is controlled by the bleeder resistor R1, which discharges the output capacitance in a slew-rate controlled manner.

When 10 volts is desired at the output, the first and third bypass switches S1, S3 are off while the second bypass switch S2 is on. The first (2:1) switched-capacitor stage is on and the second switched-capacitor stage is off. The second bypass switch S2 includes back-to-back NFETs, that operate as a source follower when the second voltage V2 transitions from 5 volts to 10 volts. As described previously, the current source I1 and anti-slewing capacitor C6 control the slew rate of the second voltage V2 as it transitions from 5 volts to 10 volts, the bleeder resistor R1 controls the transition from 10 volts back to 5 volts, and the Zener diode D1 clamps the gate-to-source voltage of the second bypass switch S2 to a safe level during steady-state operation at 10 volts (i.e. V2).

Although not explicitly shown in FIGS. 6 and 8, it should be understood by those skilled in the art that additional circuitry is useful to protect the system against various single-point failures and fault conditions such as over-current, over-temperature, and over-voltage on any and all nodes, switches, and passive components.

Figure 9:
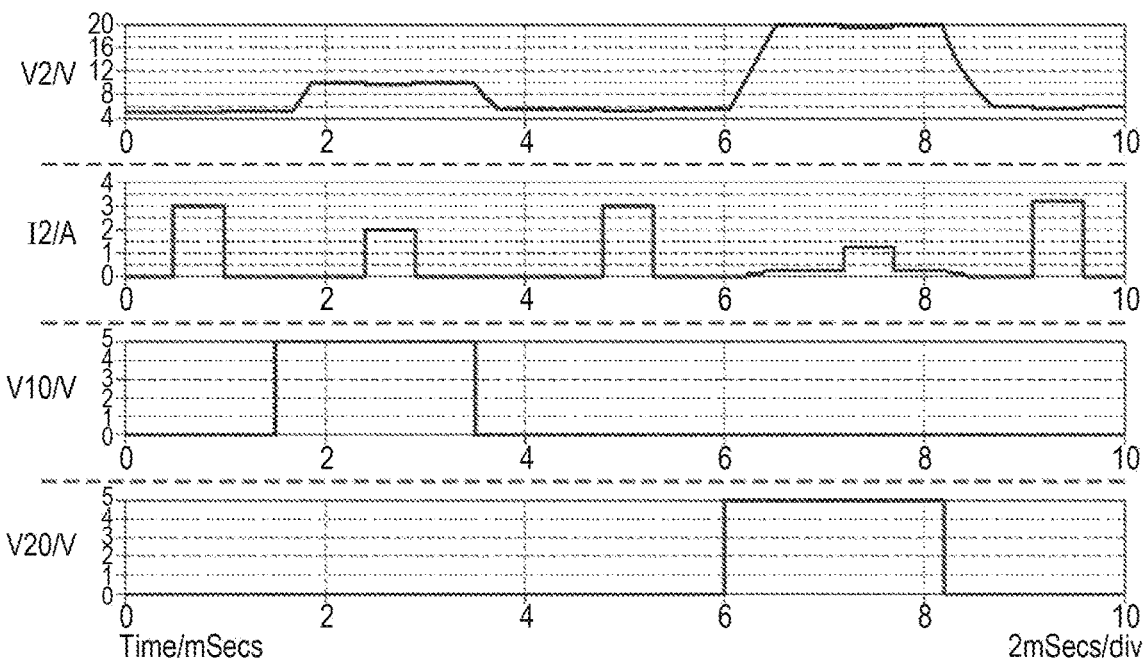
FIG. 9 shows the effects of slew control carried out by the slew-rate control circuitry shown in FIG. 6.

FIG. 9 shows typical voltage transitions for the switched-capacitor circuit with slew-rate limited bypass switch control in a Type-C USB power adapter. The second voltage V2 slews up and down at approximately 20 mV/µs. According to the USB PD specification, the load must be in a low-power standby state during voltage transitions. For the simulation results shown in FIG. 9, the load was turned on after the output settled to its final level.

Figure 10:
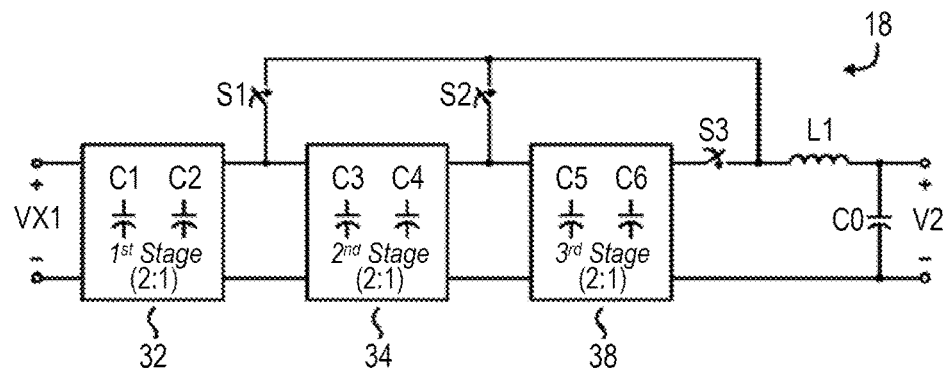
FIG. 10 shows a second embodiment of a switched-capacitor architecture for use in the power conversion circuit of FIG. 1.

FIG. 10 illustrates another embodiment of the switched-capacitor circuit 18 that is similar to that shown in FIG. 3. However, unlike in the switched-capacitor circuit 18 shown in FIG. 3, the one shown in FIG. 13 accepts an intermediate voltage VX1 of 40 volts instead of 20 volts.

To achieve this requirement, the switched-capacitor circuit 18 includes a third switched-capacitor stage 38. As before, a second voltage V2 of is 20 volts, 10 volts, or 5 volts. However, the operating modes are now a 2:1 mode, a 4:1 mode, and an 8:1 mode. Remaining details on the structure and operation of the embodiment shown in FIG. 10 are similar to those for FIG. 3 and are omitted for brevity.

Figures 11, 12:
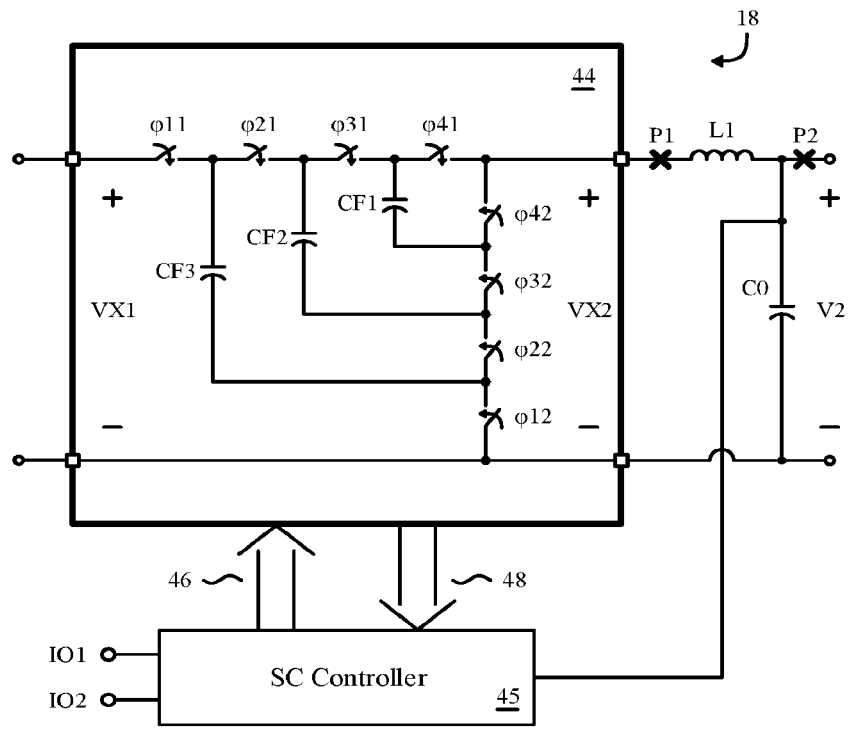
FIG. 11 is a parts list for the embodiment shown in FIG. 10.
FIG. 12 shows a third embodiment of a switched-capacitor architecture for use in the power conversion circuit of FIG. 1.

FIG. 11 shows a component list for one implementation of the switched-capacitor circuit 18 shown in FIG. 10.

FIG. 12 shows an embodiment of a switched-capacitor circuit 18 that avoids the use of multiple switched-capacitor stages and bypass switches. Instead, it relies on a switched-capacitor single stage. To achieve the various voltage conversion ratios, the embodiment shown in FIG. 12 uses different switching patterns for different voltage conversion ratios. Another difference between the embodiment shown in FIG. 12 and that shown in FIGS. 3 and 10 is that the embodiment shown in FIG. 12 cycles between four distinct states instead of two distinct states. Like the first and second embodiments, this third embodiment also has an LC filter at its output enabling adiabatic charging and discharging of the capacitors CF1-CF3.

In the embodiment of FIG. 12, slew-control can be provided by splicing a switch in series with L1 either at P1 or P2 and connecting the switch control circuit 42 to the switch terminals in the same manner illustrated twice in FIG. 6. This allows the slew rate of the voltage V2 to be controlled.

A controller 45 outputs control signals 46 to control the switches within multi-state switched-capacitor circuit 44 and receives feedback signals 48 that provide the controller

45 with information concerning voltages and currents at various locations within the multi-state switched-capacitor circuit 44. These signals enable the controller 45 to adjust operation to maintain these voltages and currents within proper limits. For example, if the voltage across one of the capacitors CF1-CF3 is outside of tolerable limits, switches within the multi-state switched-capacitor circuit 44 can be damaged.

The controller 45 also includes I/O terminals for receiving I/O signals IO1, IO2. The nature of these signals has already been discussed in connection with FIG. 2.

Figure 13:
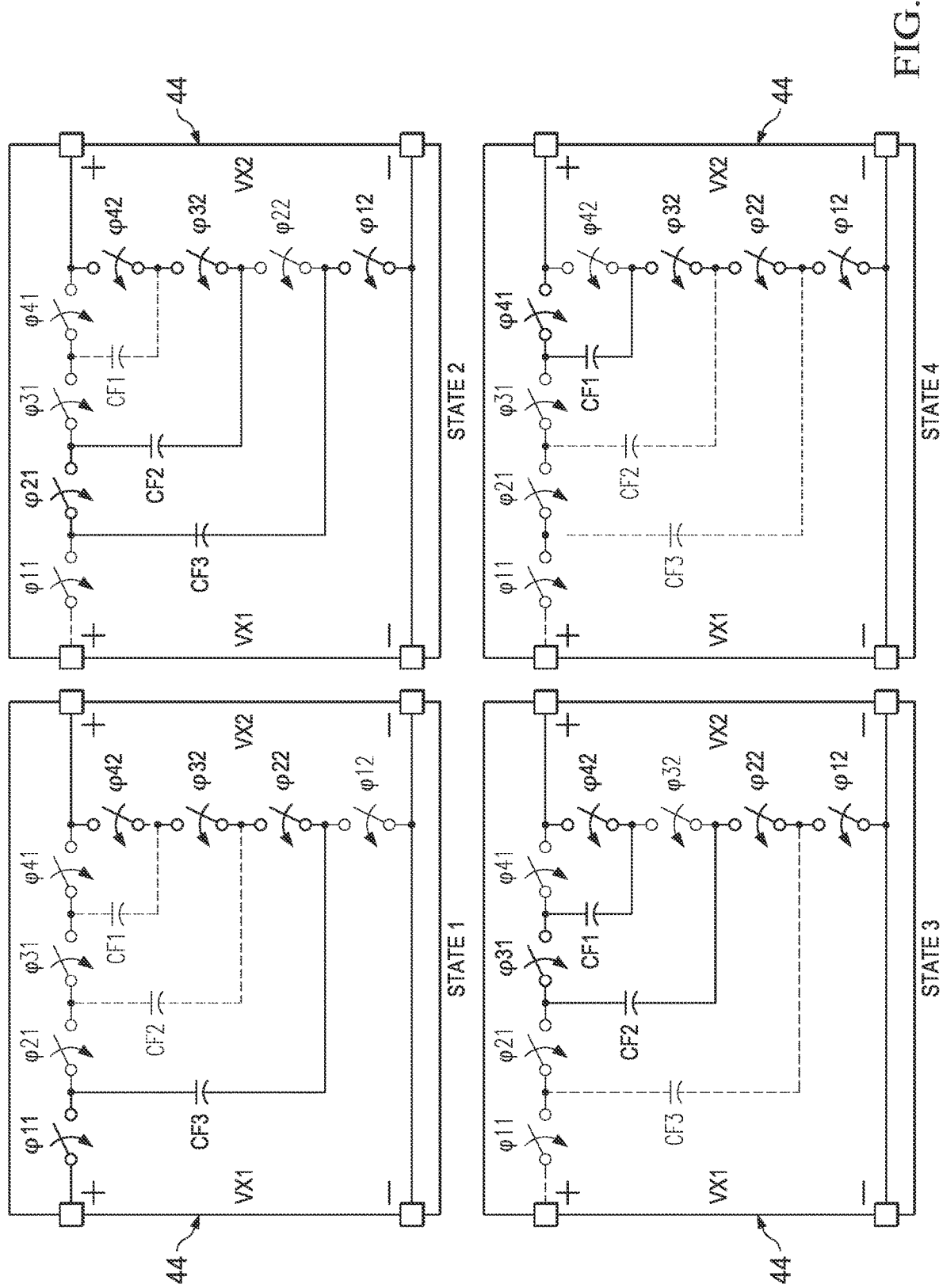
FIGS. 13 and 14 show states in the operation of the third embodiment in FIG. 12.
Figure 14:
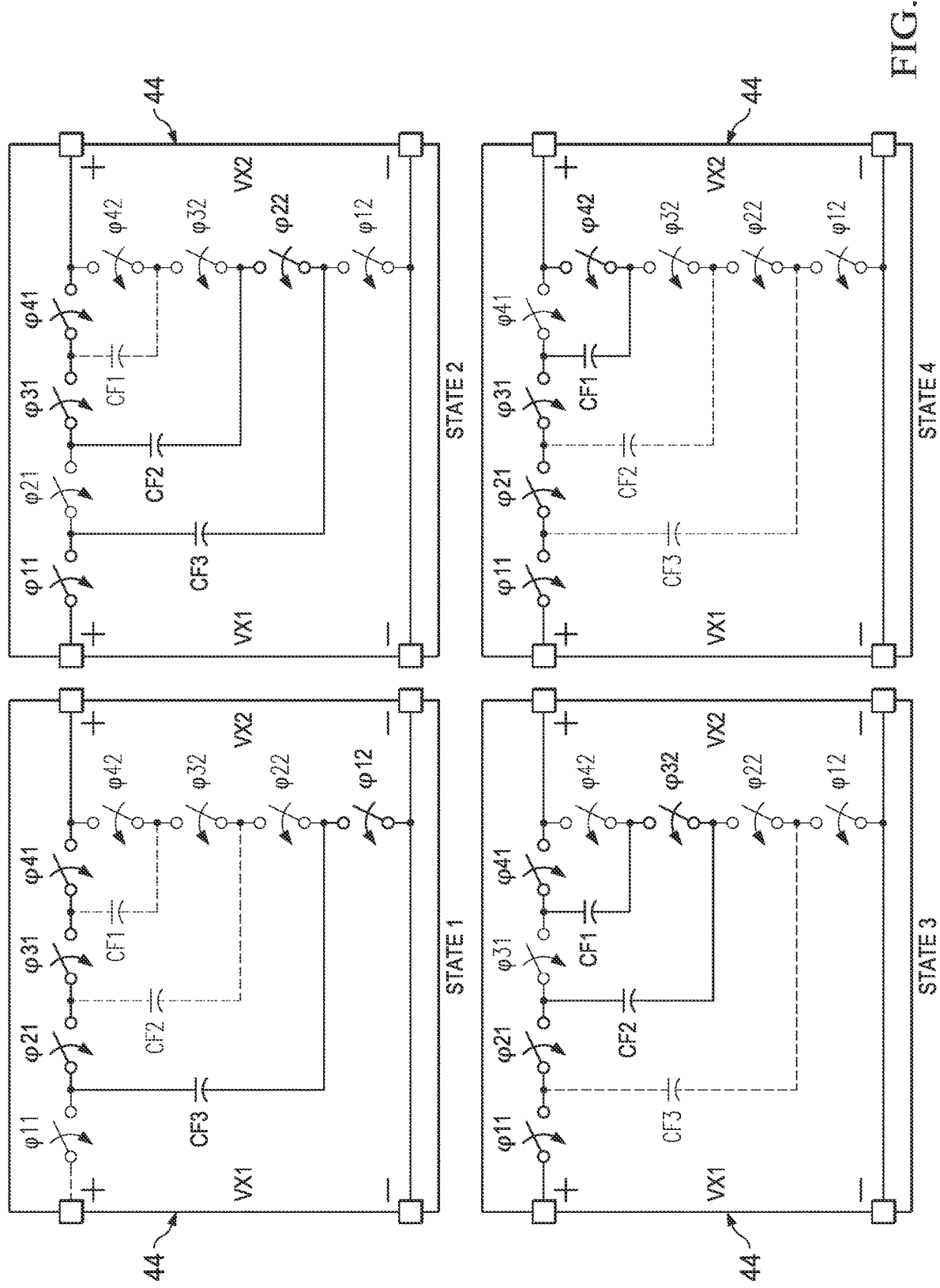

The third embodiment of the switched-capacitor circuit 18 can receive an intermediate voltage VX1 of 20 volts and produce a voltage of 20 volts, 15 volts, 10 volts, or 5 volts. For example, if the intermediate voltage VX1 is 20 volts, FIGS. 13 and 14 illustrate the corresponding four states required to produce a second voltage V2 of 5 volts and 15 volts, respectively. For best performance, it is preferable that the switched-capacitor circuit 18 switch between the states in the order shown in FIGS. 13-14.

In some implementations, a computer accessible storage medium includes a database representative of one or more components of the converter. For example, the database may include data representative of a switching network that has been optimized to promote low-loss operation of a charge pump.

Generally speaking, a computer accessible storage medium may include any non-transitory storage media accessible by a computer during use to provide instructions and/or data to the computer. For example, a computer accessible storage medium may include storage media such as magnetic or optical disks and semiconductor memories.

Generally, a database representative of the system may be a database or other data structure that can be read by a program and used, directly or indirectly, to fabricate the hardware comprising the system. For example, the database may be a behavioral-level description or register-transfer level (RTL) description of the hardware functionality in a high level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, Alternatively, the database may itself be the netlist (with or without the synthesis library) or the data set.

Having described the invention, and a preferred embodiment thereof, what is claimed as new, and secured by Letters Patent is:

1. An apparatus having an input port to be maintained at a first voltage and an output port to be maintained at a second voltage, the apparatus comprising:
    a controller to generate one or more control signals;
    a switched capacitor converter comprising a plurality of capacitors to be alternately coupled to a first group of switches or a second group of switches;
    wherein the first group of switches and the second group of switches are controlled in one or more switching patterns by one or more switching frequencies of the one or more control signals to provide different voltage conversion ratios; and
    a slew control circuitry to be coupled to the switched capacitor converter to control one or more slew rates of one or more transitions from one voltage value to another for the different voltage conversion ratios.

2. The apparatus of claim 1, further comprising one or more bypass switches, wherein the different voltage conversion ratios to be implemented, at least in part, via the one or more bypass switches to be operable by the controller to switch one or more stages of the switched capacitor converter into or out of a switched capacitor circuit.

3. The apparatus of claim 2, wherein the one or more stages of the switched capacitor converter to include at least a first and a second stage, the first and the second stages to comprise voltage dividers.

4. The apparatus of claim 3, wherein the controller comprises a primary side section and a secondary side section, the primary side section to control the first stage and the secondary side section to control the second stage, and wherein the primary side section to be isolated from the secondary side section, at least in part.

5. The apparatus of claim 1, wherein the slew control circuitry comprises a charge reservoir to facilitate control of the one or more slew rates of at least one switch from the first group of switches or the second group of switches to be coupled to the slew control circuitry.

6. The apparatus of claim 1, and further comprising a regulator to be coupled to the switched capacitor converter, the regulator to receive a first voltage and the switched capacitor converter to provide a second voltage, wherein the controller to control operation of the regulator and the switched capacitor converter.

7. The apparatus of claim 1, wherein the apparatus further comprises a power adapter.

8. The apparatus of claim 7, wherein the power adapter comprises an ACDC power adapter that includes at least one of the following: the switched capacitor converter; the slew control circuitry; the controller; or any combination thereof.

9. The apparatus of claim 7, wherein the power adapter comprises a USB port to be maintained at the second voltage.

10. The apparatus of claim 1, wherein the slew control circuitry comprises at least one capacitor and a constant current source to be used, at least in part, to control at least one slew rate of the one or more slew rates.

11. The apparatus of claim 1, wherein the slew control circuitry comprises a capacitor and a resistor through which the capacitor to be discharged to control of at least one slew rate of the one or more slew rates.

12. The apparatus of claim 1, wherein the slew control circuitry comprises a comparator to terminate control of at least one slew rate of the one or more slew rates based, at least in part, on the second voltage.

13. The apparatus of claim 1, wherein the switched capacitor converter comprises at least one of the following: an adiabatic switched capacitor converter; adiabatic switched capacitor converter; or any combination thereof.

14. An integrated circuit (IC) for use in a power converter, the IC comprising:
    a controller to generate one or more output signals based, at least in part, on one or more input signals to be received by the controller,
    the one or more output signals to be generated, at least in part, to implement a slew rate control for one or more transitions from one voltage value to another within the power converter external to the IC, wherein the slew rate control for the one or more transitions from one voltage value to another to be implemented, at least in part, to facilitate different voltage conversion ratios of the power converter, and wherein the different voltage conversion ratios to be based, at least in part, on one or more patterns of switching a plurality of switches interconnected with two or more capacitors of the power converter so as to cycle the plurality of switches through a plurality of distinct states.

15. The IC of claim 14, wherein the one or more input signals to comprise one or more feedback signals.

16. The IC of claim 14, wherein the plurality of distinct states to comprise two or more switch states of the plurality of switches.

17. The IC of claim 14, wherein the plurality of distinct states to comprise four or more switch states of the plurality of switches.

18. The IC of claim 14, wherein the power converter includes one or more bypass switches, and wherein at least one of the one or more patterns of switching the plurality of switches does not utilize the one or more bypass switches.

19. The IC of claim 14, wherein the IC is part of a power adapter.

20. The IC of claim 19, wherein the power adapter comprises a type-C USB power adapter.

\* \* \* \* \*